Dec. 30, 1958     G. I. HITCHCOX     2,866,336
LIQUID LEVEL GAGE
Filed July 6, 1953
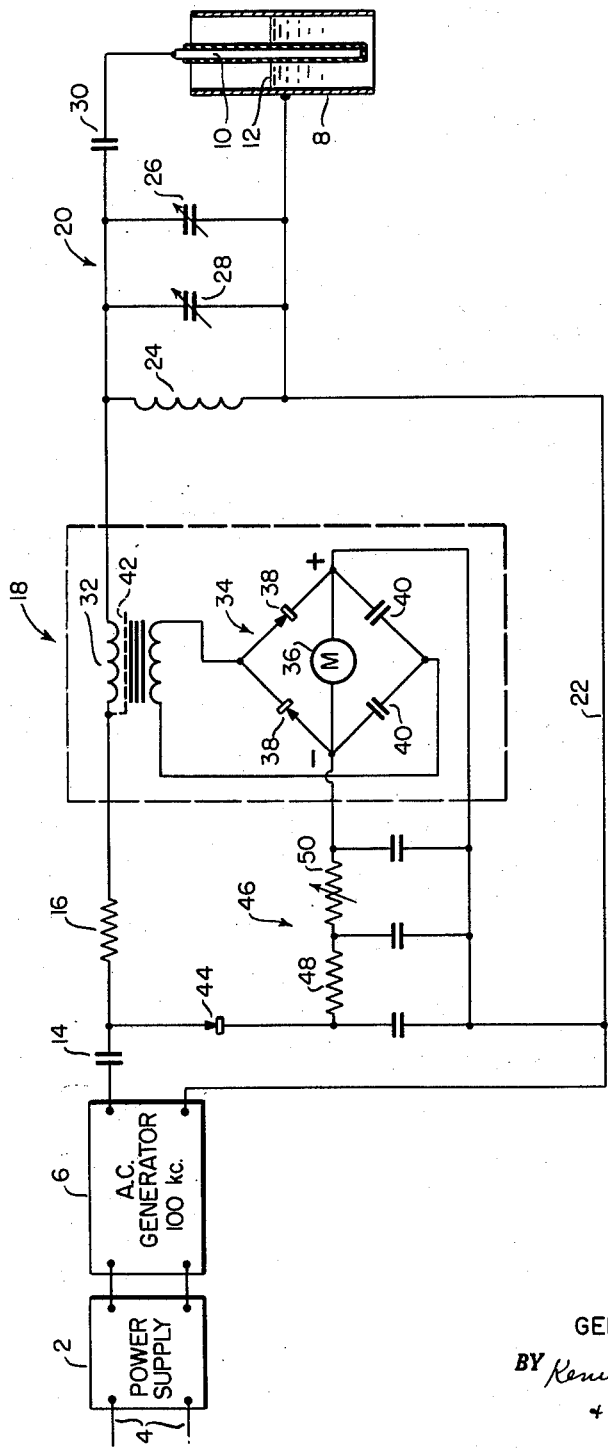
INVENTOR.
GERALD I. HITCHCOX
BY Kenway, Jenney, Witter
       + Hildreth
                  ATTORNEYS United States Patent Office 2,866,336
Patented Dec. 30, 1958

2,866,336

LIQUID LEVEL GAGE

Gerald I. Hitchcox, Cambridge, Mass., assignor to Arthur D. Little, Inc., Cambridge, Mass., a corporation of Massachusetts Application July 6, 1953, Serial No. 366,274

3 Claims. (Cl. 73—304)

The present invention relates to electrical measuring systems, and more particularly to systems for measuring a physical quantity by determination of a resonant condition.

The invention, which will be described in connection with a liquid level measuring system, although not limited thereto, involves a capacitance, the value of which varies in accordance with the quantity being measured. Thus, for example, in the case of a measuring system for determining oil level, the capacitance of the condenser varies as the level changes. Variable capacitor liquid level gauges have long been known and used, but in most instances they have operated as bridge systems, wherein the detector itself constitutes one arm of the bridge. Bridge systems are difficult to maintain and adjust, and are subject to error by reason of the necessity of balancing for both the resistive and reactive components.

The principal object of the present invention is to provide a simple and easily operated measuring system, in which the determination of the physical quantity to be measured depends upon detection of a resonant condition. Further objects are to provide a system in which a zero-reading compensator is provided.

The accompanying drawing is a diagram of the preferred system according to the present invention.

The system shown in the drawing comprises a power supply unit 2 arranged to be connected to the usual alternating current mains 4, whereby power is supplied to the A. C. generator 6. The generator is an oscillating system capable of generating oscillations of closely controlled frequency, preferably in the neighborhood of 100 kilocycles. For frequency control, the generator 6 is preferably crystal controlled, and is also preferably arranged for a substantially constant voltage output, although as will hereinafter appear, close output voltage regulation is not essential. The units 2 and 6 may be of generally conventional construction, and are not herein described in detail.

The detector unit comprises a condenser which varies in capacitance in accordance with the variations in the quantity to be measured. Thus in a liquid level gauge for measuring oil level, as herein shown, the detector comprises a condenser comprising an outer cylinder 8 and an inner rod 10, the latter being preferably coated or covered with a suitable insulating material. The capacitance of the condenser changes in accordance with the liquid level which is indicated at 12. The measuring circuit is described as follows: A lead from the generator 6 includes a condenser 14, a series resistor 16, the purpose of which will be later described, an indicator circuit indicated generally at 18, and a parallel resonant circuit 20, which is connected by the lead 22 back to the source. Referring now to the circuit 20, this includes in addition to the detecting capacitor, a fixed parallel inductance 24 which is preferably of high Q in order that the impedance at parallel resonance may be very high and a sharp resonant peak may be obtained. A measuring capacitor 26 is also provided in parallel to the inductor.

The variable capacitor 26 constitutes the measuring unit, since when the circuit is at resonance the total capacitance is substantially constant, and hence the reading of the capacitor 26 gives the measure of the detecting capacitor, whereby the liquid level or other physical quantity may be determined.

As an example of the preferred values, the inductance 24 has a value of 1 millihenry and a Q-factor of the order of 200. A capacitance of 2533 micromicrofarads is required to resonate the coil 24 at a frequency of 100 kc. This figure includes all stray capacitances together with that of the detecting condenser, and the capacitance of the coil itself. The total maximum capacitance of the system needs to be a fixed value since it corresponds to the zero reading of the variable capacitor 26. A value of 5400 micromicrofarads is satisfactory for the total maximum capacitance, in order to allow for the capacitance of the cables which connect the detector and measuring units. A trimmer condenser 28 is provided in parallel to the condenser 26, in order to adjust the capacitance initially to the above value.

A series condenser 30 is preferably included between the variable condenser 26 and the detecting condenser 8. The purpose of the capacitor 30 is to reduce the overall change of the circuit capacitance to a value which is small enough to be compensated by the variable capacitor 26. The capacitor 30 therefore reduces the sensitivity of the circuit, but allows a wide range of capacitance variations to be measured with a variable capacitor 26 of relatively small range.

The measuring circuit 18 may be of any suitable form including a series current meter. However the preferable form of circuit comprises a series transformer 32, the secondary of which is connected through a rectifier doubling circuit 34 of conventional form with a direct current meter 36. As shown in the drawing the rectifier doubler circuit comprises two rectifiers 38 and two reactors 40, the terminals of the transformer secondary being connected to two diagonal corners and the meter being connected to the other two diagonal corners (which latter are designated by plus and minus signs). It will be seen that the current through the meter is in the same direction regardless of the direction of the alternating voltage at the terminals of the doubler.

A shield 42 of standard construction preferably surrounds the primary 32, and is electrically connected to one end thereof to prevent the meter reading from being affected by stray capacitances in the transformer.

In operation it is simply necessary to adjust the variable capacitor 26 until the meter reading is a minimum. From the value of its capacitance, the capacitance of the detecting unit 8 may be computed, or the capacitance 26 may be calibrated in terms of liquid level. Since the dynamic impedance of the tuned circuit 20 is finite even at resonance, the minimum reading of the meter will not be zero at any time. It is desirable that the meter operate on a true zero rather than merely a minimum reading. To that end, a feature of the invention contemplates the provision of a backoff or compensating current to apply an artificial zero to the meter. This is done by providing an additional direct current supply. According to the preferred arrangement, the additional circuit is taken off between the condenser 14 and resistor 16, through a rectifier 44. The rectifier leads to a resistance-capacitance filter circuit 46, including a fixed series resistor 48 and a variable resistor 50, the latter being provided to adjust the compensating circuit to give a zero meter reading at resonance. The resistor 50 is directly connected to the minus terminal of the meter, while the plus terminal is connected to the bottom of the filter circuit and to the lead 22. Thus the rectified and filtered compensating current can be adjusted to give under test conditions a zero potential difference across the meter at resonance.

Since the compensating current is derived from the main oscillator, which also drives the measuring circuit, accuracy of compensation is not affected by any changes in voltage or frequency of the power supply. Furthermore, the compensating system increases the overall sensitivity of the equipment. This follows from the fact that at resonance the measurement current is at its minimum, since the impedance of the tuned circuit is at its maximum. Owing to the voltage regulation characteristics of the generator, the compensating current will also be at its maximum and in a direction opposite to the measurement current; therefore the sharpness of the zero condition is markedly increased.

The series resistor 16 has heretofore been mentioned. This is a resistor of considerable magnitude, preferably of the order of 10,000 ohms. At resonance when the impedance of the tuned circuit is of the order of 100,000 ohms, the resistor 16 has very little effect. However if the circuit is widely mistuned it becomes the governing series impedance and its then relatively high value protects the meter circuit from damage by overload.

The invention having been described, I claim:

1. A liquid-level measuring system comprising a source of alternating voltage, a variable-impedance detecting unit in which the impedance depends on the liquid level, a circuit including said detecting unit and a manually-variable impedance, means for establishing a condition of parallel resonance for said circuit, a measuring unit including a transformer having its primary connected in series with the parallel circuit, a meter and doubling circuit connected to the secondary of the transformer, and compensating means energized by said source and connected with the meter for applying a compensating current to the meter.

2. A liquid-level measuring system comprising a source of alternating voltage, a variable-impedance detecting unit in which the impedance depends on the liquid level, a circuit including said detecting unit and a manually-variable impedance, means for establishing a condition of parallel resonance for said circuit, a measuring unit including a transformer having its primary connected in series with the parallel circuit, a meter and doubling circuit connected to the secondary of the transformer, a compensating circuit, a rectifier connecting said source with the compensating circuit, and connections between the compensating circuit and the meter to render the meter reading substantially zero at resonance.

3. A liquid-level measuring system comprising a source of alternating voltage, a variable-impedance detecting unit in which the impedance depends on the liquid level, a detecting circuit including said detecting unit and a manually-variable impedance, means for establishing a condition of parallel resonance for said circuit, a measuring unit including a transformer having its primary connected in series with the parallel circuit, a meter, a doubling circuit consisting of a bridge having two rectifier arms and two capacitor arms, connections from the secondary of the transformer to two diagonal junctions of the bridge and from the meter to the other junctions thereof to cause the meter to be energized by rectified current, a direct-current compensating circuit energized by said source, and connections from the compensating circuit to the meter to apply a zero-reading compensation to the meter for the condition of parallel resonance of the detecting circuit.

References Cited in the file of this patent

UNITED STATES PATENTS

| | | |
|---|---|---|
| 1,924,087 | Allen | Aug. 29, 1933 |
| 2,222,221 | Burford | Nov. 19, 1940 |
| 2,231,035 | Stevens et al. | Feb. 11, 1941 |
| 2,241,190 | Fenning | May 6, 1941 |
| 2,349,992 | Schrader | May 30, 1944 |
| 2,375,084 | Coroniti et al. | May 1, 1945 |
| 2,602,833 | Swift | July 8, 1952 |
| 2,651,751 | Heath | Sept. 8, 1953 |